United States Patent [19]

Pantelleria et al.

[11] Patent Number: 5,097,494
[45] Date of Patent: * Mar. 17, 1992

[54] X-RAY AUTOMATIC SYNCHRONOUS INSPECTION SYSTEM

[75] Inventors: James B. Pantelleria, Pontiac, Mich.; Jay G. Schreckendgust, Victor, N.Y.; Mark M. Bergeron, Kokomo, Ind.

[73] Assignee: X-Ray Industries, Inc., Troy, Mich.

[ * ] Notice: The portion of the term of this patent subsequent to Nov. 7, 2006 has been disclaimed.

[21] Appl. No.: 417,367

[22] Filed: Oct. 5, 1989

Related U.S. Application Data

[63] Continuation-in-part of Ser. No. 939,603, Dec. 9, 1986, Pat. No. 4,879,734.

[51] Int. Cl.$^5$ ............................................. H05G 1/34
[52] U.S. Cl. ..................... 378/110; 378/57; 378/91; 378/95; 378/109; 378/8; 378/68
[58] Field of Search ............. 378/91, 95, 97, 98, 378/101, 109, 110, 57, 56, 68, 4, 8, 10, 108

[56] References Cited

U.S. PATENT DOCUMENTS

| | | | |
|---|---|---|---|
| 4,139,771 | 2/1979 | Dennhoven et al. | 378/57 |
| 4,566,115 | 1/1986 | Brunn et al. | 378/97 |
| 4,879,734 | 11/1989 | Schreckendgust et al. | 378/57 |

Primary Examiner—Edward P. Westin
Assistant Examiner—Don Wong
Attorney, Agent, or Firm—Dykema Gossett

[57] ABSTRACT

An X-ray inspection apparatus and method allow inspection of the contents of containers moving rapidly past an inspection station. The system includes an X-ray source pulsed by control logic, an image amplifier for converting an X-ray image of the container contents to a visible image and a solid-state camera for converting the visible image into video signals which are processed by a computer-controlled image processor. Clear images are produced of the contents of rapidly moving containers by pulsing the X-ray source. Control logic and a reject mechanism eject containers having foreign contaminants. Image illuminance stability is enhanced by feedback signals from the vision computer which operate a motorized camera lens.

20 Claims, 4 Drawing Sheets

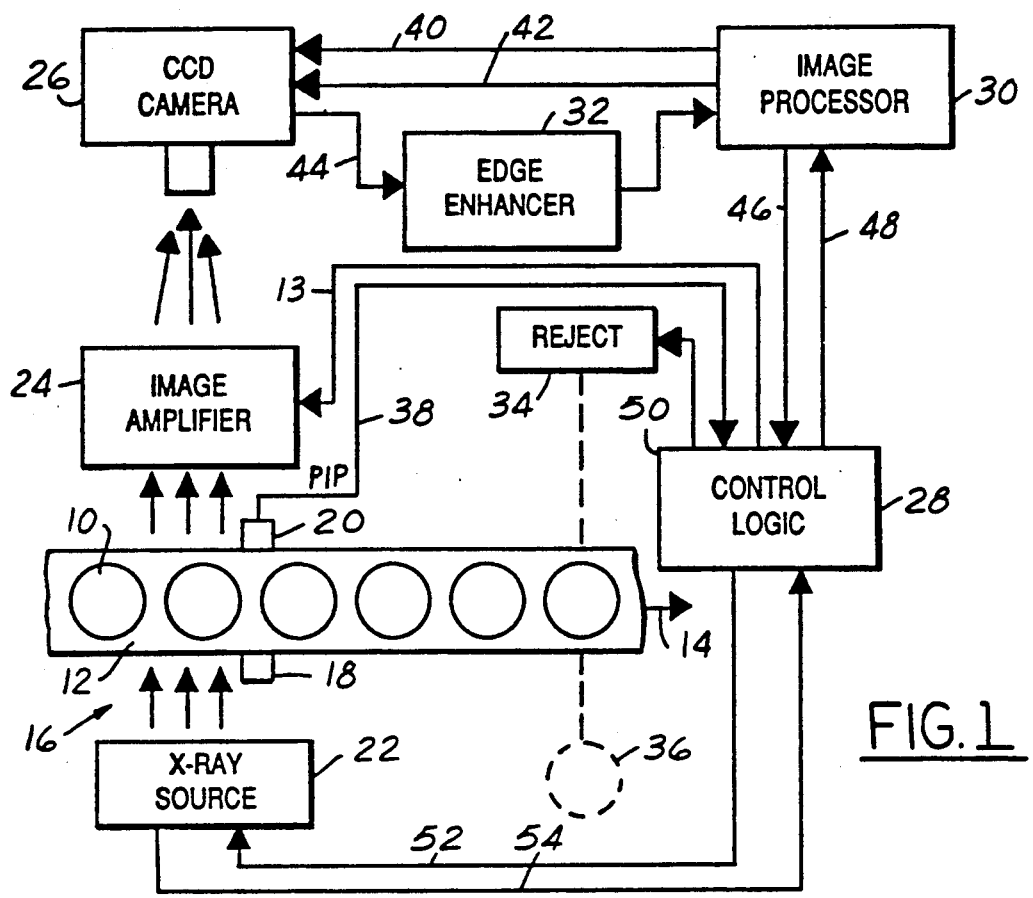
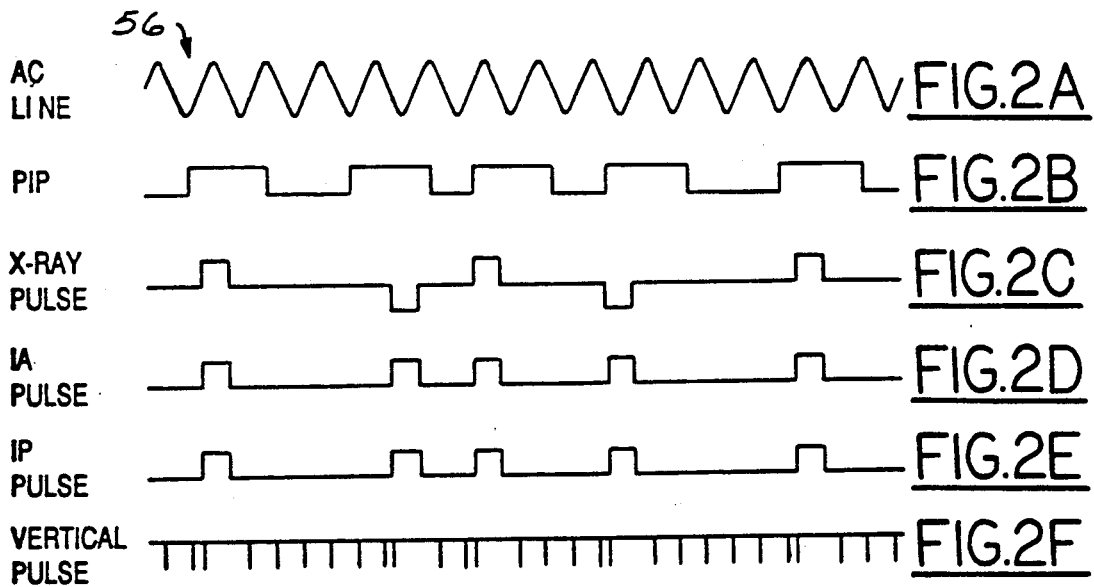
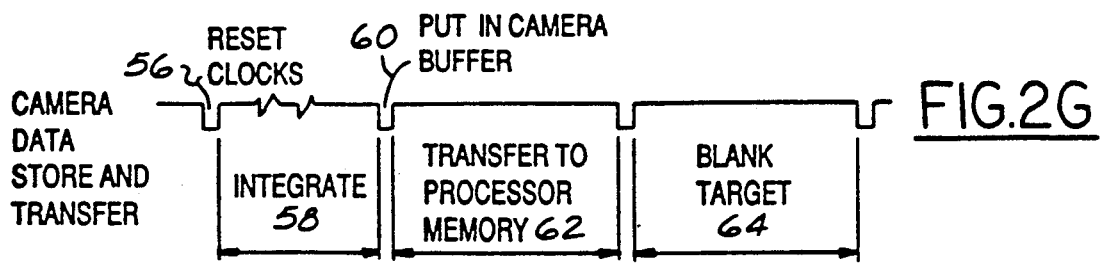

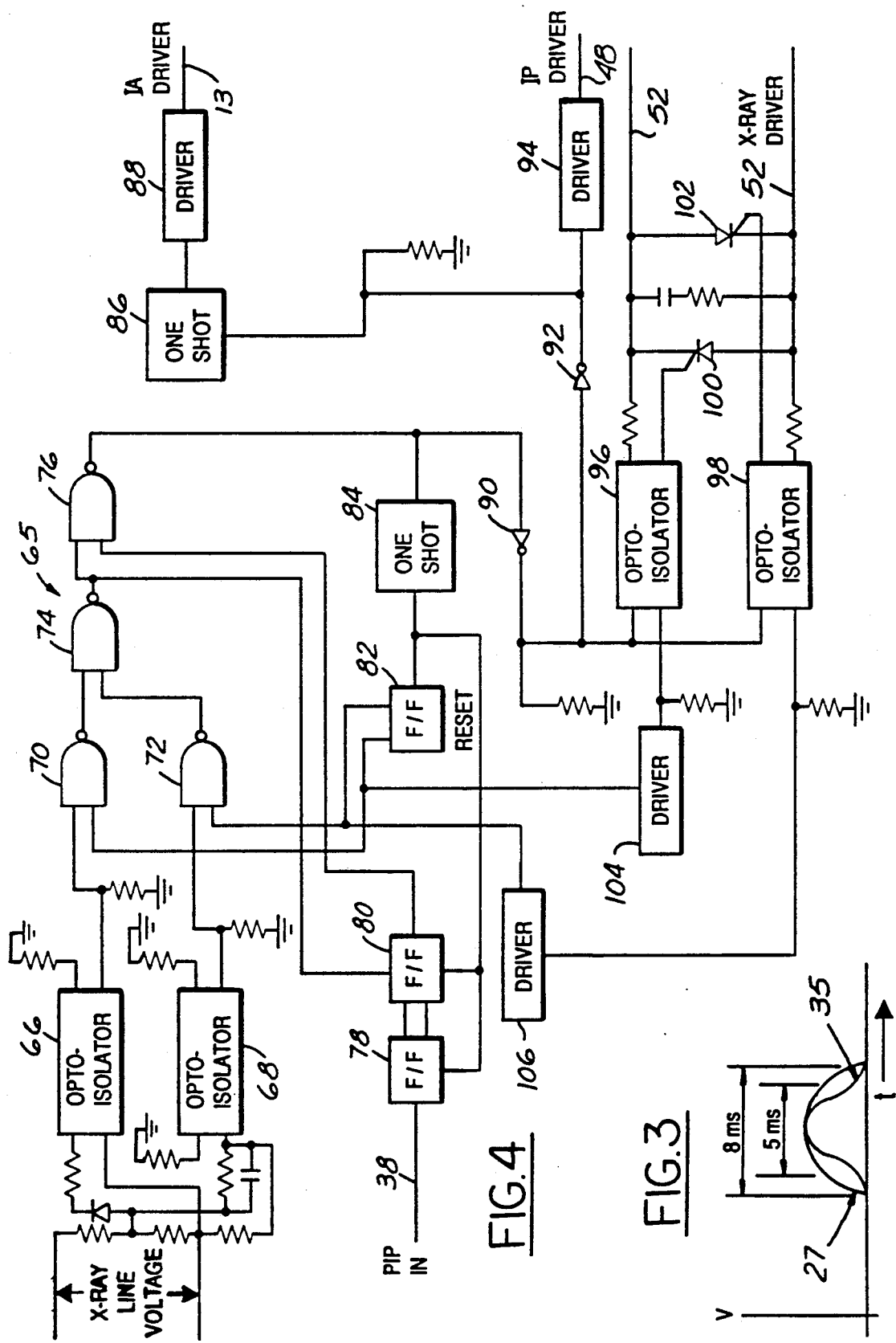

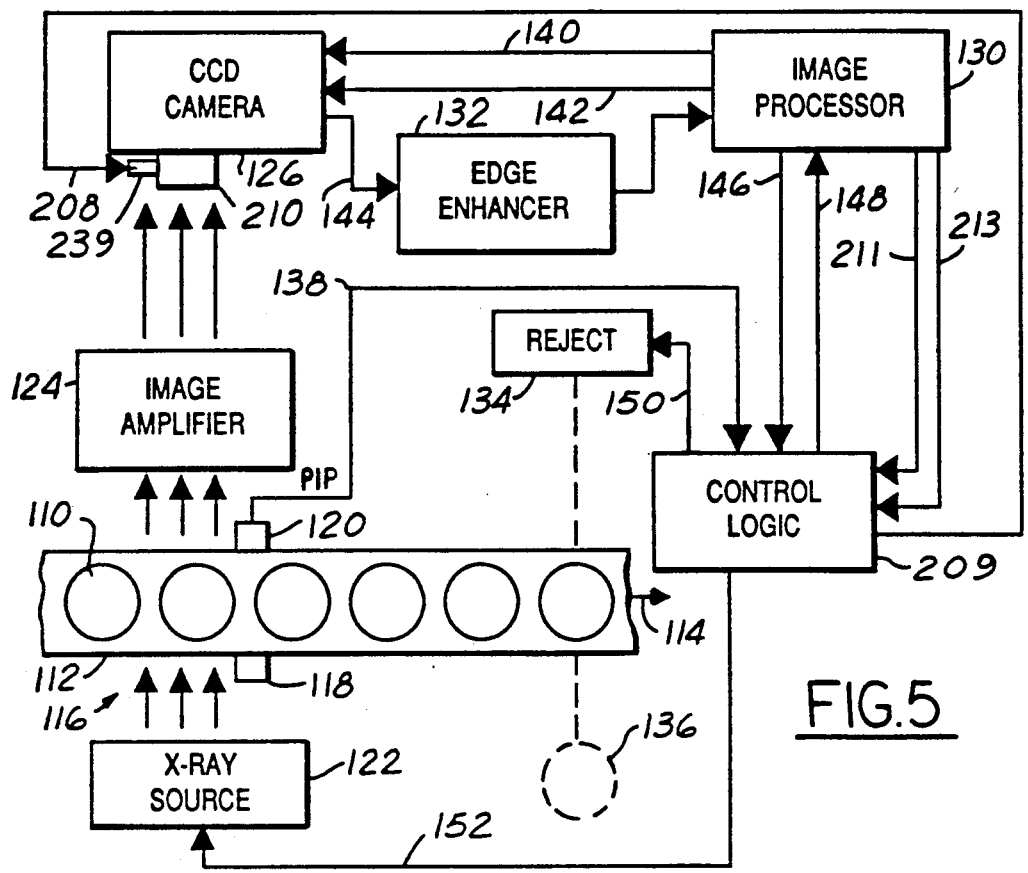
FIG.5
PIP PULSE — FIG.6A
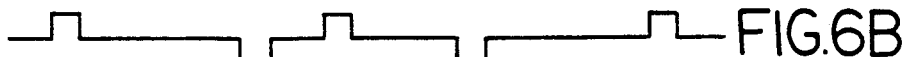
X-RAY PULSE — FIG.6B
IP PULSE — FIG.6C
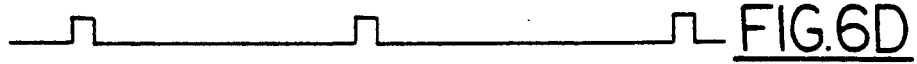
BRIGHTEN IMAGE PULSE — FIG.6D
DARKEN IMAGE PULSE — FIG.6E
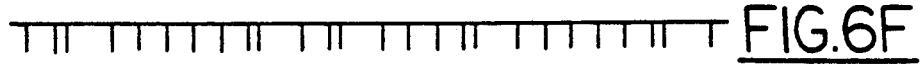
VERTICAL PULSE — FIG.6F
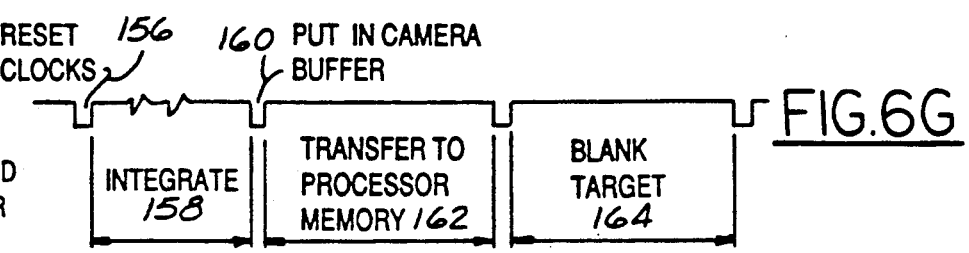
CAMERA DATA STORE AND TRANSFER PULSE — FIG.6G

X-RAY AUTOMATIC SYNCHRONOUS INSPECTION SYSTEM

RELATED APPLICATIONS

This application is a continuation-in-part of U.S. patent application Ser. No. 939,603 filed Dec. 9, 1986, now U.S. Pat. No. 4,879,734.

TECHNICAL FIELD

The present invention generally relates to X-ray inspection systems and deals more particularly with a method and apparatus for inspecting the contents of containers moving rapidly through an inspection station.

BACKGROUND ART

Various types of methods and apparatus have been devised in the past for the purpose of inspecting the contents of containers while the containers are in movement. Such systems typically include means such as a conveyor for moving the containers along a path and an inspection station where the contents of each container are inspected using X-ray techniques. One application of such a system is shown in U.S. Pat. No. 3,924,064 issued Dec. 2, 1985 which discloses the use of X-ray inspection equipment for the purpose of inspecting the contents of luggage and baggage.

X-ray inspection systems of the type described above are also well known for use in connection with automatic production line inspection. For example, U.S. Pat. No. 3,958,078 issued May 18, 1986 discloses an X-ray inspection method and apparatus for inspecting the contents of containers such as glass jars filled with food products in which an X-ray image is scanned to provide video signals that are processed in a manner which allows detection of very small foreign particles and without the need for precisely positioning the container at the inspection station. The system disclosed in this prior patent employs a pulsed X-ray source and real time processing which is synchronized to the power line frequency (60 Hz). An X-ray source is pulsed when the presence of a container is detected at the inspection station by a sensor. The resulting X-ray image is processed by an image intensifier which forms a visible image that is converted to a video signal by a camera. The video signal is then analyzed to detect foreign particles or defects in the contents of the container.

Known systems of the type described in the patents mentioned above are limited in their ability to provide container content analysis where the containers are moving at very high speeds through an inspection station, as in a production environment. This limitation is a result of the fact that the resulting X-ray image which is recorded becomes blurred due to rapid movement of the containers. For example, in connection with the container food processing industry, production line rates of between 900 and 1200 or more jars per minute are typical. In other words, approximately 900 to 1200 jars move past an inspection station each minute. Heretofore, it has not been possible to examine the food contents of these jars for foreign particles on a continuous basis at these production rates. Thus, in the past, it was necessary to employ off-line lot sampling techniques to inspect the contents of food containers. Such techniques are, of course, less than completely desirable since foreign particles representing serious health risks may be introduced into those containers that are not inspected.

Many X-ray detection systems, such as the system disclosed in previously-mentioned U.S. Pat. No. 3,958,078, use the cycling of the power line signal to aid in triggering the X-ray source on and off. While this approach has some advantages inasmuch as it allows simplification of the electronic control circuitry, it also has certain disadvantages. One of the most significant disadvantages is that the firing of the X-ray source is partly dependent upon the random phasing of the power line signal. This dependence results in the ultimate image clarity and system speed that can be achieved.

Numerous approaches are employed for turning the X-ray source on and off. A common approach is to switch the X-ray source on by means of a solid-state switching device such as an SCR or a thyristor and allow the X-ray source to be switched off via indirect means. Such indirect means typically uses the cycling of an alternating current source or the natural oscillation of an LRC circuit to reverse bias an SCR or thyristor that is in series with the X-ray source. In U.S. Pat. No. 3,958,078, the natural oscillations of an LRC circuit is used to reverse-bias a thyristor that is placed in series with the primary winding of the X-ray source step-up transformer. Using indirect means to switch the X-ray source off places much dependence on circuit elements whose tolerances and accuracy are difficult to control. This control problem occurs in both the manufacture of the elements and their use and results in X-ray source timing errors at high operational speeds.

Accordingly, it is the primary object of the present invention to provide a high-speed X-ray inspection system.

A further object of the present invention to provide an X-ray inspection system which uses a direct means for turning off the X-ray source.

Still a further object of the present invention is to provide an X-ray inspection system as described above wherein the firing of the X-ray source is not dependent upon the phasing of an alternating current signal.

Still yet a further object of the present invention is to provide an X-ray inspection system which automatically controls the intensity of the X-ray image.

Yet another object of the present invention is to provide an X-ray inspection system described above which is simple in design and allows the inspection process to be performed fully automatically.

These and further objects of the invention will be made clear or will become apparent during the course of the following description of the preferred embodiments of the present invention.

SUMMARY OF THE INVENTION

According to one aspect of the invention, apparatus is provided of the type having an X-ray source for inspecting the contents of each of a plurality of containers moving through an inspection station. Position signal generating means are provided for detecting the movement of a container through the inspection station.

Means in the nature of a circuit are provided for generating a trigger signal in response to the sensing of a container in the inspection station. A control signal generating means is responsive to the trigger signal for producing a waveform having a predefined amplitude contour which is used to control the intensity of radiation emitted from the X-ray source.

The electrical current controlling means is coupled to the control signal generating means for controlling the electrical current delivered through the X-ray source in proportion to the amplitude contour of the control signal. The current through the X-ray source causes the X-ray source to irradiate the container with X-rays, thereby creating an X-ray image of the contents of the containers.

Means is provided for capturing the X-ray image, and means is provided for analyzing the X-ray image for any improprieties. The control signal generating means is coupled between the circuit means and the electrical current controlling means. The clarity of the X-ray image formed is due in part to using a direct current to drive the X-ray source. The capturing means includes a camera for recording the X-ray image and a light restriction means disposed in the optical path of the camera for restricting the intensity of the X-ray image captured by the camera.

The X-ray inspection system further includes a means for controlling a direct current delivered through the X-ray source in inverse proportion to the amplitude contour of the signal generated by said control signal generating means.

In accordance with another aspect of the invention, a method is provided for inspecting the contents of each of a plurality of containers moving through an inspection station which comprises the steps of sensing the presence of a container moving through the inspection station; generating in response to sensing a container a waveform having a predefined amplitude contour; controlling a direct current delivered to an X-ray source in proportion to the amplitude contour of the waveform having a predefined amplitude contour, the direct current causing the X-ray source to irradiate the sensed container with X-rays, thereby creating an X-ray pattern which represents the contents of the container; capturing the X-ray pattern; and analyzing the X-ray pattern.

BRIEF DESCRIPTION OF THE DRAWINGS

In the drawings, which form an integral part of the specification and are to be read in conjunction therewith, and in which like reference numerals are employed to designate identical components in the various views:

FIG. 1 is a combined block and diagrammatic view of an X-ray inspection system which forms a first embodiment of the present invention;

FIGS. 2A-2F are timing diagrams of various control signals employed in the system shown in FIG. 1, wherein FIG. 2A is the AC line current, FIG. 2B is the part-in-place signal, FIG. 2C is the X-ray control pulse, FIG. 2D is the image amplifier control pulse, FIG. 2E is the image processor control pulse and FIG. 2F is the video vertical synchronizing pulses;

FIG. 2G is a waveform plot of the camera data storage and transfer sequence;

FIG. 3 is a waveform plot of the output of the image amplifier;

FIG. 4 is a combined block and detailed schematic diagram of the control logic for the system shown in FIG. 1;

FIG. 5 is a combined block and diagrammatic view of an X-ray inspection system which forms a second embodiment of the present invention;

FIGS. 6A-6G are pulse timing diagrams of various electrical signals found in the embodiment shown in FIG. 5; and, FIG. 7 is a block diagram of the control logic used in the embodiment shown in FIG. 5.

DETAILED DESCRIPTION OF THE PREFERRED EMBODIMENTS

Figure 7:
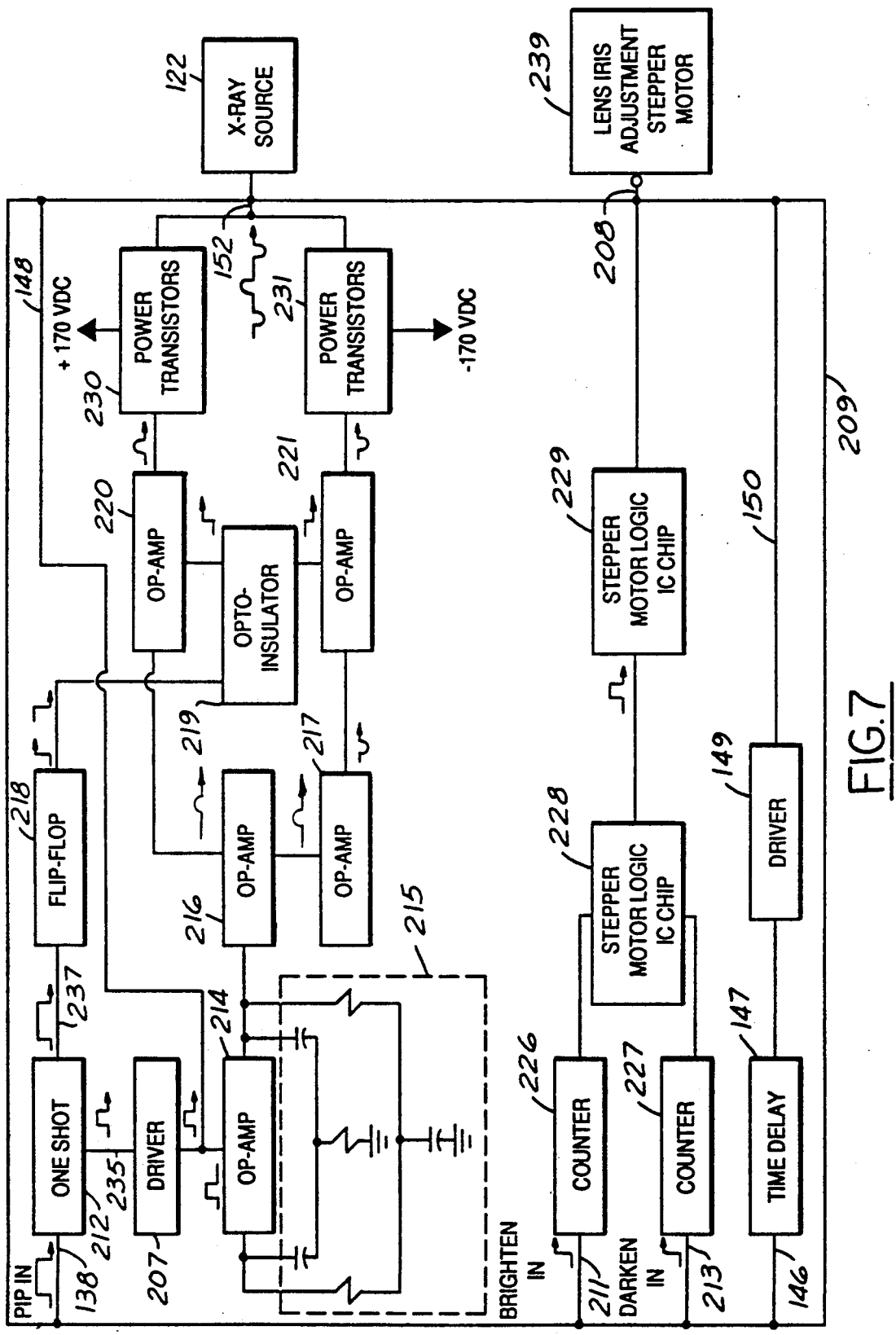

Referring first to FIGS. 1 and 2, the present invention generally relates to a device-implemented method for inspecting each of a plurality of containers 10 moving along a path past an inspection station generally indicated by the numeral 16. The containers 10 are moved by a conveyor 12 or the like in the direction of the arrow 14. The containers 10 may comprise, by way of example, glass jars filled with food products which must be inspected for foreign particles. The method and apparatus of the present invention are well suited to inspecting containers 10 which move through the inspection station 16 at very high rates of speed, e.g., in excess of 1200 containers per minute.

The system broadly includes an X-ray source 22, an image amplifier 24, a camera 26, control logic 28, and an image processor 30. The X-ray source 22 and image amplifier 24 are positioned on opposite sides of the path of travel of the containers 10 such that X-rays from the X-ray source 22 which inundate the container 10 result in an X-ray image which is received by the image amplifier 24. The X-ray source 22 may be of a conventional type such as that available from the X-Cel Corporation and designated by the model "Ureka." The X-ray source 22 is a full-wave rectified AC type with a pulsed output and therefore has a relatively low duty cycle. As will be discussed later in more detail, the X-ray source 22 is pulsed in response to a control signal delivered from the control logic 28 on line 52. This control pulse is shown in FIG. 2C.

The control logic 28 generates the X-ray control pulse on line 52 in response to a part-in-place (PIP) control signal received on line 38 from a photosensor 20. The photosensor 20 is positioned on one side of the conveyor 12 opposite a light source 18. The light source 18 delivers a beam of light to the photosensor 20, which beam is interrupted as a result of the containers 10 passing therethrough. The light source 18 and photosensor 20 are of a conventional type well known in the art.

The image amplifier 24, sometimes referred to in the art as an image intensifier, is of a type well known in the art such as that available from Precise Optics of Bay Shore, New York and identified by the manufacturer's model No. AD-493. The image amplifier 24 includes an input phosphor (not shown) and an output phosphor (not shown). X-rays striking the input phosphor produce electrons which are accelerated and focused on the output phosphor, resulting in the production of a visible image on the output phosphor for a predetermined length of time, e.g., much less than five milliseconds. The image amplifier normally retains a displayed image. Consequently, in connection with the present invention, the image amplifier 24 is pulsed, i.e., turned on and off, using a control signal pulse received on line 13 from the control logic 28. The control signal pulse delivered to the image amplifier 24 is depicted in FIG. 2D and is coincident in time with the peak of the X-ray pulse 27 shown in FIG. 3. The waveform of the image amplifier output is designated as 35.

The resulting image on the output phosphor of the image amplifier 24 is picked up by the camera 26 which is preferably of a CCD (charge couple device) type, such as that manufactured by NEC and identified by the manufacturer's model No. T125A. The length of time of the exposure of the camera 26 to the X-ray image output by the image amplifier 24 generally depends on the rise time of the image amplifier 24, but may be, in the present example, between 2 microseconds and 5 milliseconds. It has been discovered that by exposing the camera 26 for only a portion of the time that the X-ray image remains on the input phosphor of the image amplifier 24. A more highly focused, clearer image is recorded. The recording interval, which is depicted in FIG. 3 as less than 5 milliseconds, occurs during the peak of the 8 millisecond half-wave output of the image amplifier 24.

The camera 26 produces a single image field of 480 non-interlaced lines which is scanned at a standard rate of 16.6 milliseconds per field. The last three lines of each camera field are blanked out to allow transfer of the data (charges) from the camera's sensor array to the image processor 30. Even at relatively high rates of container movement, the amount of displacement of the container during each camera field is not sufficient to seriously diminish the stored image quality.

The camera 26 receives vertical and horizontal synchronization control pulses on lines 40 and 42 respectively from the image processor 30. Video signals representing each camera field are delivered on line 44 to an edge enhancer, thence to the image processor 34 for processing. The edge enhancer 32 is a conventional device such as that manufactured by For-A and identified by the manufacturer's model No. IV-530. The edge enhancer 32 is operative to operate on the video signals received on line 44 in a manner which increases the resolution of the edges of the video image.

The image processor 30 may comprise, by way of example, a Videk, model No. 150, and is employed to process and analyze each video field recorded by the camera 26. The processor 30 includes conventional software for analyzing the video image and detecting the presence of foreign particles in the contents of the containers 10. The image processor 30 is activated by an image processor pulse shown in FIG. 2E and received from the control logic 28 on line 48. In the event that the image processor 30 detects the presence of foreign particles in the container 10, a reject signal is issued on line 46 to the control logic 28. The control logic 28 is responsive to this reject signal to issue a control signal on line 52 to conventional reject mechanism 34. The reject mechanism 34 may comprise any of various known designs and is effective to remove the container 10 having contaminants therein by displacing the container from the conveyor 12 to a lateral position 36.

The details of the control logic 28 are depicted in FIG. 4 and will be discussed in more detail later. Before discussing the control logic 28, a description of the operation of the system will now be provided, and reference is concurrently made now to FIGS. 1-3. The presence of a container 10 at the inspection station 16 is detected by the photosensor 20 which produces the PIP control signal on line 38. The leading edge of the PIP control signal, which is depicted in FIG. 2B, is sensed by control logic 28. The control logic 28 also senses the line voltage (FIG. 2A) which is used to pulse the X-ray source 22. The control logic 28 produces a positive and negative clock control signal respectively corresponding to the commencement of the positive and negative half cycles of the AC line voltage, thereby keeping track of the polarity of the AC line voltage as a function of time.

Polarity sensing of the AC line voltage is important for the following reason. In connection with relatively high-speed pulsing of the X-ray source 22, after the source 22 is pulsed, the core of the high-voltage transformer forming part of the X-ray source 22 retains a portion of its magnetic field. Due to the high-speed pulsing of the system, this excess field does not have time to dissipate sufficiently and, as a result thereof, when the X-ray source 22 is pulsed again, there is a delay before X-rays are generated. This delay in X-ray generation lasts until the excess field is dissipated. The problem of excess field retention is eliminated in connection with the present system by reversing the AC current flow to the high-voltage transformer after every pulse applied to the X-ray source 22. By reversing the AC current flow, the excess field is very rapidly dissipated, thereby allowing immediate generation of X-rays without delay. Thus, by sensing the polarity of the AC line voltage, it is possible to alternate the current flow through the high-voltage transformer in half-wave segments. In connection with a 60 Hz power system, each half-wave segment is approximately 8 milliseconds in duration.

Thus, in the particular system illustrated herein, after the rising edge of the PIP control signal is detected, there is a zero to 1/60th second wait until the rising edge of the next positive or negative clock (depending upon the polarity of the last pulse) before the source 22 generates X-rays. As shown in FIGS. 2C-2E, the control logic 28 simultaneously delivers synchronized gating pulses to the X-ray source 22, image amplifier 24 and image processor 30, respectively on lines 52, 13 and 48.

The output phosphor of the image amplifier 24 is blanked until the gating pulse is received on line 13. As previously mentioned, the image amplifier 24 is pulsed for a duration of much less than 5 milliseconds, as shown in FIG. 3. During this latter-mentioned pulse while the image is present on the output phosphor, the sensor array of the camera 26 is exposed to such image for a short interval, e.g., 2 milliseconds, during that portion of the X-ray pulse when the image has the greatest intensity. The relationship of the X-ray pulse and the 5 millisecond exposure is shown in FIG. 3.

After the pulsing of the image amplifier 24, the electrons impinging on the output phosphor are defocused, thereby blanking the output phosphor until a subsequent pulse is received by the image amplifier 24. As will be discussed later in more detail, the width of the short duration pulse supplied to the image amplifier 24 is readily adjustable using a later-discussed monostable multivibrator.

As previously mentioned, the image processor 30 supplies the camera 26 with horizontal and vertical synchronizing control pulses on lines 40 and 42 respectively. These horizontal and vertical synchronizing pulses are not synchronized with the AC line current, but rather are synchronized to the independent clock of the image processor 30. When the image processor 30 receives its gate pulse on line 48 from control logic 28, the internal clock of the image processor 30 is reset, and the image processor 30 in turn resets the horizontal and vertical clocks which produce the synchronizing signals on lines 40 and 42. The resetting of the horizontal and vertical clocks of the image processor 30 is depicted by the numeral 56 in FIG. 2G. As shown during the timing interval indicated by the numeral 58 in FIG. 2G, the camera 26 then integrates the image formed on the output phosphor of the image amplifier 24 for a preprogrammed time period which is typically from 5 to 250 times the horizontal clock rate. Following integration, a vertical pulse is issued at 60 in FIG. 2G during which the charges stored on the sensor array are read and placed into a buffer (not shown) forming part of the camera 26. Following the vertical pulse 60, the buffer is read line by every other line into a memory (not shown) of the image processor 30 until an image field is formed. This latter-mentioned interval is designated by the numeral 62 in the timing diagram of FIG. 2G. After the formation of a complete field in the memory of the image processor 30, the processor 30 stops receiving video information from the camera 26 and proceeds to analyze the image. At this point, the camera 26 continues to receive normal horizontal and vertical synchronizing pulses and creates a black base image on the target, as indicated at 64 in FIG. 2G, until the next pulse is issued on line 13 by the control logic 28.

As previously mentioned, the video data passes from the camera 26 on line 44 through an edge enhancer 32. The edge enhancer 32 employs a high pass filter to sense steep gradients of gray scale and expands them in time.

In the event that the image processor 30 detects foreign particles or contaminants in the contents of the container 10, a command is issued on line 46 to the control logic which in turn generates a reject signal on line 50, thereby activating the reject mechanism 34 to eject the container 10 from the conveyor line 12.

Attention is now directed to FIG. 4 which depicts the details of the control logic 28 (FIG. 1). The AC line voltage employed to pulse the X-ray source 22 is converted by a pair of opto-isolators 66, 68 into a pair of clock signals respectively representing the positive and negative halves of the AC line voltage. These two clock signals are respectively delivered to the corresponding inputs of NAND gates 70 and 72 which form a part of a logic array 65. NAND gates 70 and 72 are selectively enabled by the output of a flip-flop 82. Flip-flop 82 effectively operates as a toggle in order to invert the positive or negative clock signal and disable the other. Upon disablement, the disabled one of the gates 70, 72 goes high, thereby enabling NAND gate 74 which effectively inverts the clock signal which was inverted by the enabled one of the gates 70, 72. At this point, the circuit has selected either the positive or negative clock to pulse the X-ray source 22, and the circuit then waits for receipt on line 38 of the PIP signal.

The PIP control signal on line 38 sets the flip-flops 78, 80 which in turn enable the NAND gate 76, thereby inverting the selected clock signal at the output of NAND gate 76. The PIP control signal effectively forms the clock signal for flip-flop 78. On the rising edge of the PIP control signal, flip-flop 78 outputs a 1 and zero to the corresponding inputs of flip-flop 80. The outputs of flip-flop 78 do not change state until reset by a reset signal generated by a one shot 84 (monostable multivibrator). The one shot 84 is actuated by the clock control signal output from NAND gate 76.

The next rising edge of the clock signal at the output of NAND gate 74 causes flip-flop 80 to output a 1, thereby enabling NAND gate 76. Flip-flop 80 remains high until reset by the one shot 84. Enablement of NAND gate 76 effectively inverts the clock signal to its output, and the inverted clock signal is inverted again by an inverter 90.

As previously mentioned, the rising or back edge of the clock signal output from NAND gate 76 actuates the one shot 84 to produce a pulse which resets flip-flops 78 and 80. Disabling flip-flops 78 and 80 effectively disables the PIP signal on line 38, thereby disabling NAND gate 76. This arrangement has the effect of allowing only one pulse of the clock to be processed, which corresponds to a single half-wave segment of the AC line voltage which, in the case of a 60 Hz system, is 8.3 milliseconds in pulse width.

The pulse inverted by the inverter 90 enables current to flow through the LED portion of either opto-isolator 96 or 98, depending upon the state of flip-flop 82. Flip-flop 82 turns on one of the drivers 104 and 106, thereby sinking current through the corresponding opto-isolators 96, 98. Current flowing through either of the opto-isolators 96, 98 results in the firing of corresponding SCRs 100, 102 which in turn allow either a positive or negative AC half-wave to energize the X-ray source 22. Upon the termination of the clock signal output by NAND gate 76 which results in the pulses shown in FIGS. 2C-2E, the flip-flop 82 is toggled by the one shot 84, thereby conditioning the flip-flop 82. Toggling of the flip-flop 82 has the effect of alternately enabling the drivers 104, 106 in accordance with the polarity of the half-wave of the AC line voltage.

The single pulse passing through the inverter 90 also passes through a buffer inverter 92 which fires an interface driver 94 to produce the pulse on line 48 which is delivered to the image processor 30. The pulse passing through the inverter 92 fires a one shot 86. The one shot 86 is adjustable, for example, from one-tenth to ten milliseconds and delivers an output pulse through a driver 88 onto line 13 which is delivered to the image amplifier 24. Adjustment of the pulse output by the one shot 86 determines the time period that the image amplifier 24 remains unblanked. From the description immediately above, it may be appreciated that the image processor 30, image amplifier 24 and X-ray source 22 are pulsed simultaneously.

Reference will now be made to FIGS. 5 through 7, which show a second embodiment of the disclosed invention. FIG. 5 shows a plurality of containers 110 moving along a path past an inspection station generally indicated by the numeral 116. The containers 110 are moved by a conveyor 112 or the like in the direction of the arrow 114. The containers 110 may comprise, by way of example, glass jars filled with food products which must be inspected for foreign particles. The method and apparatus of the present invention are well suited to inspecting containers 110 which move through the inspection station 116 at very high rates of speed, e.g., in excess of 1200 containers per minute.

The system broadly includes an X-ray source 122, an image amplifier 124, a camera 126, control logic 209, and an image processor 130. The X-ray source 122 and image amplifier 124 are positioned on opposite sides of the path of travel of the containers 110 such that X-rays from the X-ray source 122 which irradiate the container 110 result in an X-ray image which is received by the image amplifier 124. The X-ray source 122 may be of a conventional type such as that available from the X-Cel Corporation and designated by the model "Ureka." The X-ray source 122 is of a pulsed type driven by a direct current source. As will be discussed later in more detail, the X-ray source 122 is pulsed in response to a control signal pulse delivered to the X-ray source 122 from the control logic 209 on line 152. This control pulse is shown in FIG. 6B.

The control logic 209 generates the X-ray pulse on line 152 in response to a part-in-place (PIP) control signal received on line 138 from a photosensor 120. The photosensor 120 is positioned on one side of the conveyor 112 opposite a light source 118. The light source 118 delivers a beam of light to the photosensor 120, which beam is interrupted as a result of the containers 110 passing therethrough. The light source 118 and photosensor 120 are of a conventional type well known in the art.

The image amplifier 124, sometimes referred to in the art as an image intensifier, is of a type well known in the art such as that available from Precise Optics of Bay Shore, New York and identified by the manufacturer's model No. AD-493. The image amplifier 124 includes an input phosphor (not shown) and an output phosphor (not shown). X-rays striking the input phosphor are accelerated and focused on the output phosphor, resulting in the production of a visible image on the output phosphor for a predetermined length of time, e.g. approximately one-half of a millisecond.

The resulting image on the output phosphor of the image amplifier 124 is picked up by the camera 126 which is preferably of a CCD (charge couple device) type, such as that manufactured by NEC and identified by the manufacturer's model No. T125A. The length of time of the exposure of the camera 126 to the X-ray image output by the image amplifier 124 generally depends on the duration of the X-ray pulse but may be, in the present embodiment, between 2 microseconds and 0.5 milliseconds.

The camera 126 produces a single image field of 480 non-interlaced lines which is scanned at a standard rate of 16.6 milliseconds per field. The last three lines of each camera field are blanked out to allow transfer of the data (charges) from the camera's sensor array to the image processor 130. Even at relatively high rates of container movement, the amount of displacement of the container during each camera field is not sufficient to seriously diminish the stored image quality.

The camera 126 receives vertical and horizontal synchronization pulses on lines 140 and 142 respectively from the image processor 130. Video signals representing each camera field are delivered on line 144 to an edge enhancer, thence to the image processor 134 for processing. The edge enhancer 132 is a conventional device, such as that manufactured by For-A, and identified by the manufacturer's model No. IV-530. The edge enhancer 132 is operative to operate on the video signals received on line 144 in a manner which increases the resolution of the edges of the video image.

The image processor 130 may comprise, by way of example, a Videk, model No. 150, and is employed to process and analyze each video field recorded by the camera 126. The processor 130 includes conventional software for analyzing the video image and detecting the presence of foreign particles in the contents of the containers 110. The image processor 130 is activated by an image processor pulse shown in FIG. 6C and received from the control logic 209 on line 148. In the event that the image processor 130 detects the presence of foreign particles in the container 110, a reject signal is issued on line 146 to the control logic 209. The control logic Z09 is responsive to this reject signal and issues a delayed reject control signal on line 150 to a conventional reject mechanism 134. The reject mechanism 134 may comprise any of various known designs and is effective to remove the container 110 having contaminants therein by displacing the container from the conveyor 112 to a lateral position 136.

In addition to analyzing image data for the presence of foreign particles in the container, the image processor 130 determines if the X-ray image being captured by camera 126 is brighter or darker than a preprogrammed image brightness threshold. This determination is conducted by using the following technique. Upon every other PIP pulse (FIG. 6A), the image processor 130 analyzes the brightness of the X-ray image and issues a brighten image pulse (FIG. 6D), if appropriate, to counter 226 along line 211. Upon every remaining PIP pulse (FIG. 6A), the image processor 130 analyzes the darkness of the X-ray image and issues a darken image pulse (FIG. 6E), if appropriate, to counter 227 along line 213. The X-ray control 209 uses the darken image pulses (FIG. 6E) and the brighten image pulses (FIG. 6D) to control the iris adjustment on camera lens 210. The X-ray controller accomplishes this iris control by counting brighten pulses in counter 226 and counting darken pulses in counter 227. These pulse counts are acted upon by a standard stepper motor logic circuit 228 to genera(e the proper drive phases to control the rotation direction and speed of the stepper motor 239 used for iris adjustment.

The details of the control logic 209 are depicted in FIG. 7 and will be discussed in more detail later. Before discussing the control logic 209, a description of the operation of the system will now be provided and reference is concurrently made now to FIGS. 5-7. The presence of a container 110 at the inspection station 116 is detected by the photosensor 120 which produces the PIP control signal on line 138. The leading edge of the PIP control signal, which is depicted in FIG. 6A, is sensed by X-ray control logic 209. In connection with relatively high-speed pulsing of the X-ray source 122, after the source 122 is pulsed, the core of the high-voltage transformer forming part of the X-ray source 122 maintains a portion of its magnetic field. Due to the high-speed pulsing of the system, this excess field does not have sufficient time to dissipate and when, as a result thereof, the X-ray source 122 is pulsed again, there is a delay before X-rays are generated. This delay in X-ray generation lasts until the excess field is dissipated. The problem of excess field retention is eliminated in connection with the present system by reversing the current flow to the high-voltage transformer after every pulse applied to the X-ray source 122. By reversing the current flow, the excess field rapidly dissipates, thereby allowing immediate generation of X-rays without delay. The X-ray control 209 accomplishes this current reversal after every pulse by alternately amplifying the positive and negative waveforms supplying the X-ray tube head 122 with current. The period of waveform may be adjusted from 0.1 msec to ∞ msec with the preferred range being from 0.5 msec to 10 msec.

Unlike the first embodiment shown in FIGS. 1-4, X-ray control logic 209 experiences virtually no variation of delay between the part in position pulse 138 and the X-rays produced by source 122. This causes the X-ray image to appear motionless on the camera 126, easing inspection test configuration and allowing more accuracy in detecting foreign particles within containers 110. When the X-ray control 109 receives the PIP signal 138, it fires the X-ray source 122 and sends out the image processor enable pulse 148.

The image processor 130 supplies the camera 126 with horizontal and vertical synchronizing control pulses on lines 140 and 142 respectively. These horizontal and vertical pulses are synchronized to the independent clock (not shown) of the image processor 130. When the image processor 130 receives its gate pulse on line 148 from control logic 209, the internal clock of the image processor 130 is reset, and the image processor 130 in turn resets the horizontal and vertical clocks which produce the synchronizing signals on lines 140 and 142. The resetting of the horizontal and vertical clocks of the image processor 130 is depicted by the numeral 156 in FIG. 6G. As shown during the timing interval indicated by the numeral 158 in FIG. 6G, the camera 126 then integrates the image formed on the output phosphor (not shown) of the image amplifier 124 for a preprogrammed time period which is typically from 5 to 250 times the horizontal clock rate. Following integration, a vertical pulse is issued at 160 in FIG. 6G during which the charges stored on the sensor array are read and placed into a buffer (not shown) forming part of the camera 126. Following the vertical pulse 160, the buffer is read line by every other line into a memory (not shown) of the image processor 130 until an image field is formed. This latter-mentioned interval is designated by the numeral 162 in the timing diagram of FIG. 6G. After the formation of a complete field in the memory of the image processor 130, the processor 130 stops receiving video information from the camera 126 and proceeds to analyze the image. At this point, the camera 126 continues to receive normal horizontal and vertical synchronizing pules and purges the stored image in preparation for the next inspection cycle. This purge time is indicated at 164.

As previously mentioned, the video data passes from camera 126 on line 144 through an edge enhancer 132. The edge enhancer 132 employs a high pass filter to sense steep gradients of gray scale and expands them in time.

In the event that the image processor 130 detects foreign particles or contaminants in the contents of the container 110, a command is issued on line 146 to the control logic, which in turn generates a delayed reject signal on line 150, thereby activating a conventional reject mechanism 134 to eject the container 110 from the conveyor line 112.

Attention is now directed to FIG. 7 which depicts the details of the control logic 109. The part-in-place signal (PIP) input is a positive square pulse which rises upon the detection of a container 110 to be X-rayed. The PIP signal's rising edge initiates a positive square pulse with one shot 212 on line 235 having a time duration equaling that needed to fire one X-ray pulse. The pulse on line 235 enables driver 207. The rising edge of the driver 207 output signal which appears on line 148 enables the image processor 130 to capture images from camera 126 and begins testing.

The output of driver 207 is also used to enable operation of the op-amp 214. Op-amp 214 is a waveform generator. Three capacitors and three resistors 215 are configured in a feedback network around op-amp 214. This circuit configuration is known by those skilled in the art as a twin-tee oscillator circuit. Twin-tee circuit 215 is the feedback loop of op-amp 214. By adjusting the resistance and capacitance values 215, various waveform contours can be produced such as a one millisecond half-wave sinusoid. The signal from op-amp 214 enters op-amp 216. Op-amp 216 buffers the waveform from the rest of the circuit and supplies two buffered waveforms identical to the waveform from op-amp 214.

One of the buffered waveforms from op-amp 216 is sent to op-amp 217 which inverts the waveform and sends the inverted waveform to op-amp 221. The other buffered waveform from op-amp 216 is sent to op-amp 220.

When one shot 212 receives the rising edges of the PIP signal, two one-shot pulses are created. One of the pulses goes to the driver 207, the other goes to flip-flop 218 along line 237. The one-shot signal sent to flip-flop 218 has a time duration greater than that needed to fire one X-ray pulse. The falling edge of the one-shot pulse causes the output of flip-flop 218 to toggle. The flip-flop 218 toggling output is received by opto-isolator 219. Opto-isolator 219 alternately enables the output signals of op-amp 220 and op-amp 221 to drive power transistor groups 230 and 231. Power transistor group 230 is connected to an adjustable positive DC voltage supply (0 V to 170 V) and amplifies the signal it receives from op-amp 220, producing waveforms typically ranging from +20 V DC to +120 V DC and at power ratings of 1000 watts. The amplified waveforms are sent to the X-ray source 122 which amplifies the waveform to the kilovolt region, thus producing X-rays in the X-ray tube (not shown). Power transistor group 231 is connected to an adjustable negative DC voltage supply (0 V to −170 V). Power transistor group 231 amplifies the signal from op-amp 221, producing waveforms typically ranging from −20 V DC to −120 V DC and at power ratings of 1000 watts. The amplified waveforms are sent to the X-ray source 122 which amplifies the waveform to the kilovolt region, thus producing X-rays in the X-ray tube (not shown). Image acquisition and testing by the image processor is initiated by the rising edge of the driver pulse appearing on line 148.

During the inspection process, the image processor 130 monitors the image brightness and sends a pulse to either counter 226 or counter 227 along line 211 or 213 respectively. When a preset count is exceeded, the stepper motor 139 is operated to counteract discrepancies in image brightness by adjusting the camera lens iris 210. The reject control signal present on line 150 is delayed from that issued on line 146 by a conventional time delay circuit 147 well known to those skilled in the art. This time delay between reject signals 146 and 150 is necessary to accommodate the time it takes a container to travel from the photosensor 120 to the reject mechanism 134. Driver 149 receives the delayed reject signal from delay circuit 147 and provides the proper current to reject mechanism 134.

From the foregoing, it is apparent that the method and apparatus of the present invention provide for the reliable accomplishment of the objects of the invention and do so in an economical manner. It is recognized, of course, that those skilled in the art may make various modifications or additions to the preferred embodiments chosen to illustrate the invention without departing from the spirit and scope of the present contribution of the art. Accordingly, it is to be understood that the protection sought and to be afforded hereby should be deemed to extend to the subject matter claimed and all equivalents thereof fairly within the scope of the invention.

I claim:

1. X-ray inspection apparatus% of the type having an X-ray source for inspecting the contents of each of a plurality of containers moving through an inspection station, comprising:

means for generating a position signal related to the movement of one of said containers through said inspection station;

circuit means responsive to said position signal for generating a trigger signal;

means responsive to said trigger signal for generating a control signal possessing a waveform having a predefined amplitude contour which is used to control the intensity of radiation emitted from said X-ray source;

means coupled to said circuit means for controlling electrical current delivered through said X-ray source in proportion to the amplitude contour of said control signal, said current through said X-ray source causing said X-ray source to irradiate said container with X-rays and creating an X-ray image of the contents of said container;

means for capturing said X-ray image; and means coupled with said capturing means for analyzing said X-ray image.

2. The apparatus of claim 1, wherein said control signal generating means is coupled between said circuit means and said electrical current controlling means.

3. The apparatus of claim 2, including a source of DC power, and wherein said electrical current is a direct current produced by said DC power source.

4. The apparatus of claim 3, further including means coupled to said central signal generating means for controlling a direct current delivered through said X-ray source and produced by said source of DC power in inverse to the amplitude contour of the signal generated said control signal generating means.

5. The apparatus of claim 4, further including means for enabling said proportional current controlling means and said inversely proportional current controlling means.

6. The apparatus of claim 5, wherein said enabling means alternates in response to the position signal between enabling said proportional current controlling means and enabling said inversely proportional current controlling means.

7. The apparatus of claim 1, wherein said capturing means includes a camera for recording said X-ray image and a light restriction means disposed in the optical path of said camera for restricting the intensity of said X-ray image captured by said camera.

8. The apparatus of claim 7, wherein said analyzing means derives a brightness correction value by comparing a value proportional to the brightness of said captured X-ray image to a preselected value.

9. The apparatus of claim 8, wherein said analyzing means converts said brightness correction value into a first set of pulses when said X-ray image brightness value is above said preselected value and converts said brightness correction value into a second set of pulses when said X-ray image brightness value is below said preselected value.

10. A method of inspecting the contents of each of a plurality of containers moving through an inspection station, comprising the steps of:

(A) sensing the presence of a container moving through said inspection station;

(B) generating, in response to sensing a container in step (A), a waveform having a predefined amplitude contour;

(C) controlling a direct current delivered to an X-ray source in proportion to the amplitude contour of the waveform generated in step (B), said direct current causing said X-ray source to irradiate the container sensed in step (A) with X-rays, thereby creating an X-ray pattern representing the contents of said container;

(D) capturing said X-ray pattern; and (E) analyzing said X-ray pattern.

11. The method of claim 10, further including the steps of:

(F) comparing the intensity of said X-ray pattern to a preselected intensity level; and (G) limiting the amount of radiation in the X-ray pattern which is captured in step (D) based on the comparison performed in step (F).

12. The method of claim 11, further including the step of controlling, in alternating sequence with step (C), a direct current through said X-ray source in inverse proportion to the amplitude contour of the waveform generated in step (B).

13. The method of claim 12, wherein said alternating between said current proportional to said waveform contour generated in step (B) and said current inversely proportional to said waveform contour is a function of the container sensed in step (A).

14. X-ray apparatus for inspecting the contents of a plurality of moving containers moving through an inspection station, comprising:

means for detecting the of one of said containers at said inspection station;

a trigger circuit responsive to said detecting means for generating a trigger pulse;

a pulse generating circuit responsive to said trigger pulse for generating a control pulse having a predefined amplitude contour;

an X-ray generating means responsive to said amplitude contour of said control pulse for irradiating one of said containers with X-rays to produce an X-ray image of said container, wherein the intensity of said X-rays is directly related to the amplitude contour of said control pulse;

means for capturing the X-ray image;

processor means coupled with said capturing means for analyzing the X-ray image to determine the contents of said container; and an adjustable iris disposed in the optical path of said camera and responsive to a command signal from said processor for attenuating the intensity of the X-ray image received by said capturing means.

15. The apparatus of claim 14, wherein said X-ray generating means further includes a first and second amplifier responsive to the amplitude contour of the control pulse and an X-ray source coupled to said first and second amplifier.

16. The apparatus of claim 15, wherein said first amplifier further includes a first enabling circuit coupled with a first power transistor circuit and said second amplifier further includes a second enabling circuit coupled with a second power transistor circuit, said first and second enabling circuits responsive to said triggering means for alternatively enabling said first and second power transistor circuits.

17. The apparatus of claim 16, wherein said X-ray generating means further includes a direct current source of electrical power and said first amplifier controls the direct current through said X-ray source in direct proportion to the amplitude contour of the control pulse, and said second amplifier controls the direct current through said X-ray source in inverse proportion to the amplitude contour of the control pulse.

18. The apparatus of claim 14, wherein said adjustable iris includes a stepper motor.

19. The apparatus of claim 14, wherein said pulse generator includes an op-amp configured with a twin-tee feedback network.

20. The apparatus of claim 14, comprising means for limiting the duration of the control pulse to between 0.1 and 10 milliseconds.

* * * * *

UNITED STATES PATENT AND TRADEMARK OFFICE
CERTIFICATE OF CORRECTION

PATENT NO. : 5,097,494

DATED : March 17, 1992

INVENTOR(S) : James B. Pantelleria, Jay G. Schreckendgust, and Mark M. Bergeron

It is certified that error appears in the above-identified patent and that said Letters Patent is hereby corrected as shown below:

Column 13, line 30, change "central" to --control--.

Column 13, line 35, before "said" insert --by--.

Column 14, line 30, after "detecting the" insert --presence--.

Signed and Sealed this

Twenty-eighth Day of September, 1993

*Attest:*

BRUCE LEHMAN

*Attesting Officer*   Commissioner of Patents and Trademarks